(12) United States Patent
Wisotzky

(10) Patent No.: US 6,406,044 B1
(45) Date of Patent: Jun. 18, 2002

(54) APPARATUS FOR ATTACHING A VEHICLE AXIS TO AN AXLE SUSPENSION

(75) Inventor: Axel Wisotzky, Frickenhausen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/451,887

(22) Filed: Dec. 1, 1999

(30) Foreign Application Priority Data

Dec. 9, 1998 (DE) .......................................... 198 56 706

(51) Int. Cl.$^7$ .............................................. B60G 17/00
(52) U.S. Cl. ................................................. 280/124.1
(58) Field of Search ....................... 280/124.1, 124.164, 280/124.166, 124.163, 679, 680, 684, 686; 403/270, 271, 272; 267/52

(56) References Cited

U.S. PATENT DOCUMENTS

| | | | | |
|---|---|---|---|---|
| 235,807 A | * | 12/1880 | Porter | 267/52 |
| 275,084 A | * | 4/1883 | Seeley | 267/52 |
| 379,839 A | * | 3/1888 | White | 267/52 |
| 1,314,817 A | * | 9/1919 | Laycock | 267/52 |
| 1,370,901 A | * | 3/1921 | Felip | 280/124.175 |
| 1,458,149 A | * | 6/1923 | Reed | 267/52 |
| 1,523,376 A | * | 1/1925 | Beran | 267/53 |
| 3,386,724 A | * | 6/1968 | Tantlinger | 267/52 |
| 3,437,333 A | * | 4/1969 | Koch | 267/52 |
| 3,547,215 A | * | 12/1970 | Bird | 280/86.75 |
| 3,580,347 A | * | 5/1971 | McGee | 180/22 |
| 3,751,021 A | * | 8/1973 | Foster | 267/52 |
| 3,773,347 A | * | 11/1973 | Traylor | 280/713 |
| 3,935,915 A | * | 2/1976 | Selly et al. | 177/136 |
| 4,033,606 A | * | 7/1977 | Ward et al. | 280/682 |
| 4,162,090 A | * | 7/1979 | Schwartz | 280/688 |
| 4,553,774 A | * | 11/1985 | Malcolm | 280/718 |
| 4,693,486 A | * | 9/1987 | Pierce et al. | 280/80.1 |
| 5,328,159 A | | 7/1994 | Kaufman et al. | 267/52 |
| 6,032,967 A | * | 3/2000 | Ogoniek | 280/124.175 |

* cited by examiner

Primary Examiner—Paul N. Dickson
Assistant Examiner—Faye M. Fleming
(74) Attorney, Agent, or Firm—Kenyon & Kenyon

(57) ABSTRACT

A means of attachment for attaching a vehicle axle to an axle suspension of a vehicle, having a spring caliper which is arranged on the upper side of the vehicle axle and on which an axle spring is supported, and having a counterplate which is arranged on the underside of the vehicle axle and to which the spring clips which engage around the vehicle axle are attached by pre-stressed attachment of the axle spring to the spring axle, is to be embodied in such a way that the load-bearing capacity of the vehicle axle or its service life is increased. According to the invention this is achieved in that two angular parts are provided which each have a vertical section and a horizontal section, the vertical sections being secured laterally to the vehicle axle, one free end of the vertical section of the one angular part being welded in each case to one free end of the horizontal section of the other angular part, the one horizontal section bearing against the top of the vehicle axle and forming or being fitted with the spring caliper, and the other horizontal section bearing against the bottom of the vehicle axle, and forming or being fitted with the counterplate.

20 Claims, 2 Drawing Sheets

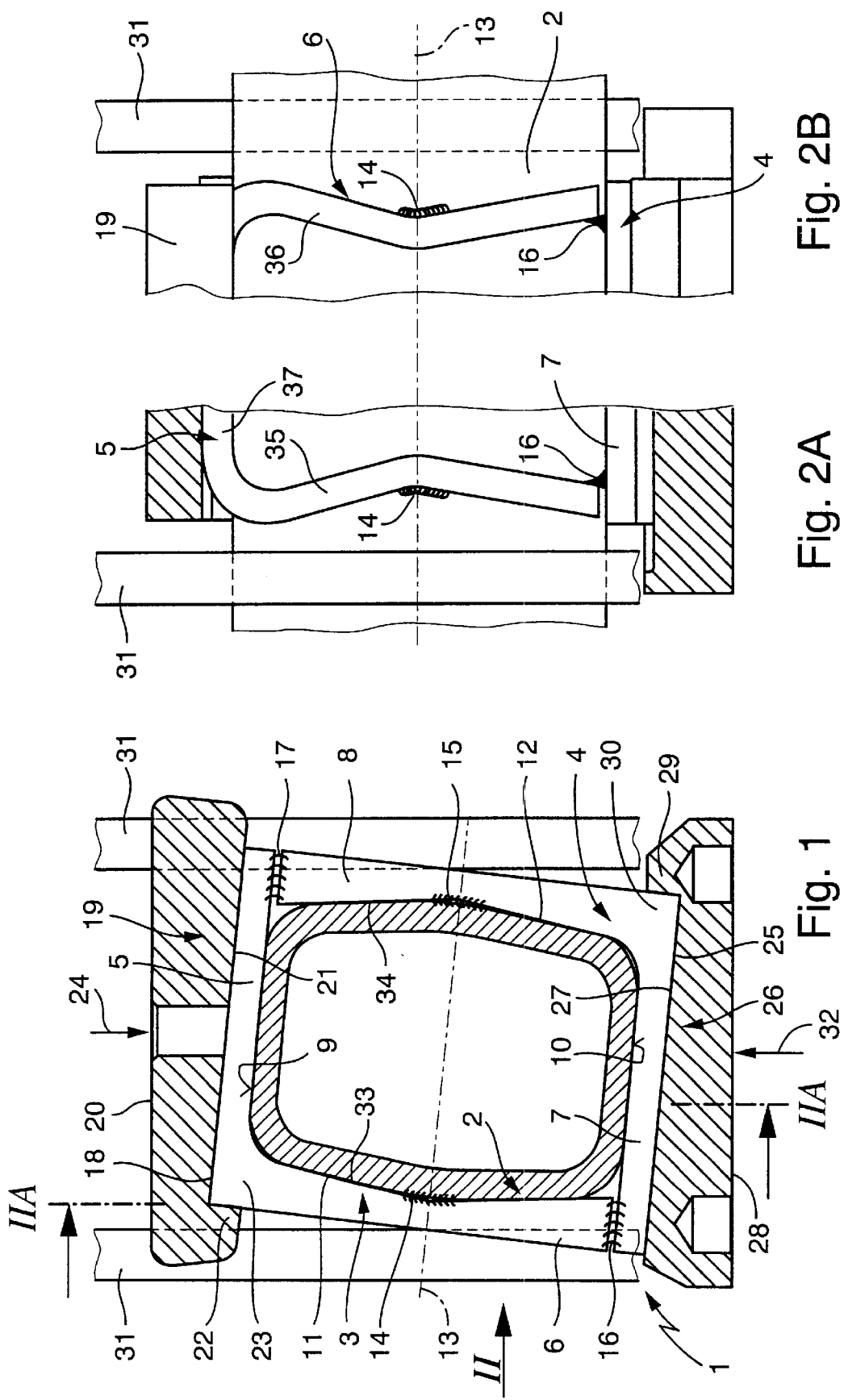

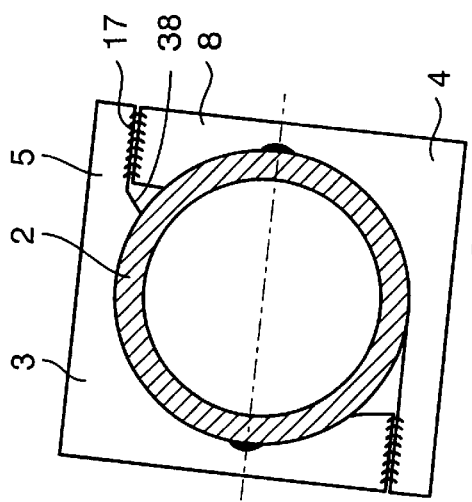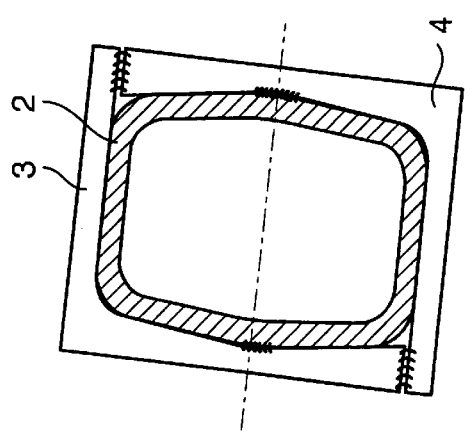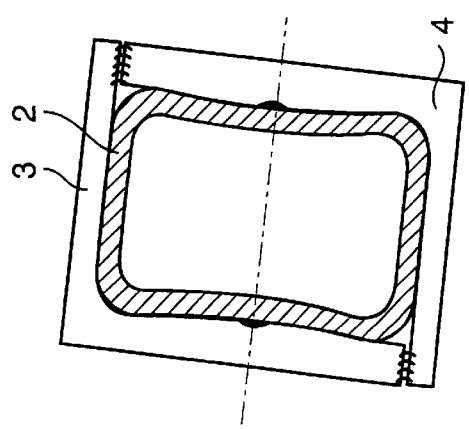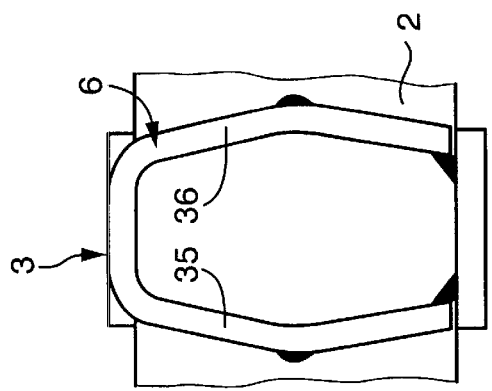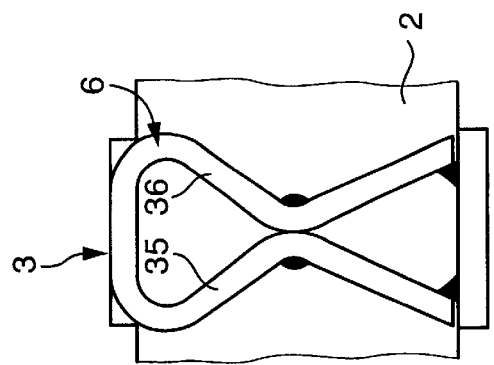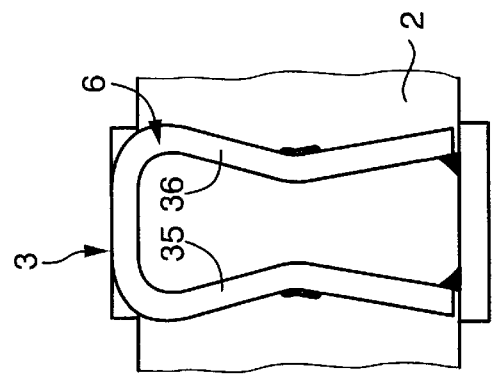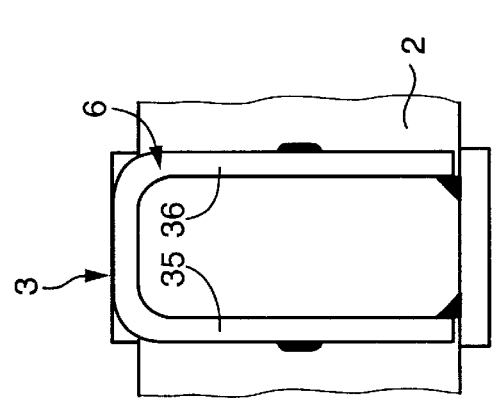

APPARATUS FOR ATTACHING A VEHICLE AXIS TO AN AXLE SUSPENSION

FIELD OF THE INVENTION

The invention relates to an apparatus for attaching a vehicle axle to an axle suspension of a vehicle, in particular of a utility vehicle.

BACKGROUND OF THE INVENTION

U.S. Pat. No. 5,328,159 discloses an attachment means, in which the vehicle axle which is equipped with vehicle wheels is mounted on a vehicle frame by means of an axle suspension. This axle bearing or axle suspension comprising axle springs which are supported on the vehicle frame at the one end and on the vehicle axles at the other. Such an axle spring is usually supported indirectly on the vehicle axle by means of a spring caliper which is mounted on the vehicle axle. In order to secure the axle spring to the vehicle axle, the axle spring has spring clips, so-called "spring clamps" which engage over the sides of the vehicle axle and are attached to a counterplate which is mounted on the vehicle axle opposite the spring caliper. Using the spring clips, a pre-stress is formed between the counterplate and spring caliper, said pre-stress being normally greater than the axle loads which are usually to be expected and borne by the axle spring.

This means of attachment for attaching the axle spring to the vehicle axle is used to transmit to the vehicle frame in a sprung fashion the forces and moments acting on the vehicle wheels or on the vehicle axle. For example, when the vehicle is braking and accelerating, tilting moments occur in the vehicle axle. Lateral forces on the vehicle wheels, for example during cornering or when travelling over an obstacle with an acute angle between the respective vehicle wheel and the obstacle, lead to lateral guiding forces in the vehicle axle. In addition, supporting forces occur which result from the overall mass of the vehicle and which are briefly multiplied when the vehicle travels through a pothole, for example.

In order to be able to secure the above mentioned spring caliper and the aforementioned counterplate as quickly and economically as possible during production line assembly, the spring caliper and the counterplate are each welded to the spring axle. Because large forces and moments have to be transmitted via the spring caliper and the counterplate, correspondingly long and thick weld seams have been formed until now. In this context, in particular in the tensile zone and compressive zone of the axle, so-called "thermal notches" occur which reduce the strength of the vehicle axle in the vicinity of the weld seam owing to thermal stresses which arise in the structure of the material during the welding process. The vehicle axle can fail in the vicinity of the thermal notches at an earlier point than can be expected on the basis of the dimensions of the vehicle axle. In order to compensate for this, the vehicle axles must be correspondingly over-dimensioned.

Because the spring caliper and the counterplate are each supported on the upper side and underside of the vehicle axle, the stability, and thus the thickness of the material of the vehicle axle must be additionally increased if high spring clip pre-stresses are to be implemented.

The present invention is aimed at overcoming one or more of the problems identified above.

SUMMARY OF THE INVENTION

The present invention is concerned with the problem of configuring a means of attachment of the type mentioned at the beginning, to such an extent that the load-bearing capacity of the vehicle axle or its service life is increased.

Furthermore, there is a need to adapt the means of attachment more easily to different variants of axle suspensions and axle arrangements. Finally, the intention is that the means of attachment will be more economical to construct.

As a solution, the invention proposes a means of attachment with the features of claim 1.

The invention is based on the general idea of using two angular parts to reinforce the vehicle axle in the region in which the axle spring engages on the vehicle axle, the angular part completely engaging around the vehicle axle and being supported one against the other in such a way that the vehicle axle is at least largely relieved of loading by the pre-stress of the spring clips. The spring caliper and the counterplate are then formed on these angular parts so that long weld seams with a correspondingly deep penetration can be dispensed with, thus minimizing the formation of thermal notches in the vehicle axle. Correspondingly, either the vehicle axle loading can be increased or, with unchanged axle loading, the service life of the vehicle axle can be increased or the material thickness of the vehicle axle reduced. Moreover, the formation of the long weld seams is dispensed with, simplifying the fabrication of the attachment means.

Such angular parts can be embodied as punched parts which are deformed by bending and which can be fabricated particularly economically.

Since the angular parts bear against the vehicle axle and completely enclose it, a positive lock is formed between the angular parts and the vehicle axle, which lock makes it possible to transmit tilting moments from the vehicle axle to the axle suspension. Supporting forces are transmitted by means of the angular parts which bear against the upper side and the underside of the vehicle axle.

The angular parts are secured to the vehicle axle in order to transmit lateral guiding forces. A portion of this securement is formed by the frictional locking with which the angular parts engage around the vehicle axle. Another portion of this securement is effected by, for example, welding the angular parts to the vehicle axle in the vicinity of the neutral fibre of the vehicle axle for vertical bending stresses. In this way, a highly effective securement for transmitting lateral guiding forces is made possible without perceptibly reducing the rigidity or the strength of the vehicle axle.

The term neutral fibre is usually used to refer to the region of a component which experiences the smallest expansions when the component is subjected to bending stresses. In the present case, this neutral fibre corresponds to an essentially horizontally extending longitudinal centre plane of the vehicle axle in which vertically extending bending stresses of the vehicle axle do not bring about any expansion.

According to the invention, the angular parts are each formed from a vertical section and from a horizontal section which are connected to one another in a corner region of the angular part. Here, the vertical sections of the angular parts are secured laterally to the vehicle axle and welded to the horizontal section of the respective other angular part in such a way that high tensile forces and compressive forces can be transmitted between the angular parts. The horizontal sections of the angular parts form, or are fitted with, the spring caliper or the counterplate here.

In accordance with one advantageous embodiment of the attachment means according to the invention, firstly an underside of the spring caliper, with which the spring caliper bears against the upper horizontal section of the one angular part can have an inclination with respect to an upper side of the spring caliper, which side faces away from it and on which the axle spring is supported. Secondly, an upper side of the counterplate with which the counterplate bears against the lower horizontal section of the other angular part can then have the same inclination with respect to an underside, facing away therefrom, of the counterplate to which the spring clips are attached. These measures make it possible to vary in any desired way the installation position of the vehicle axle, i.e. the angular orientation of the axle cross section with a low degree of expenditure, in order to adapt the vehicle axle to the respective axle suspension. The inclination between the underside and upper side of the spring caliper and of the corresponding inclination between the upper side and underside of the counterplate enables the angular parts which are attached to the vehicle axle to be arranged in a cross section, laterally with respect to the longitudinal direction of the vehicle axle, rotated through the angle of the aforesaid inclination in each case. This adaptation of the installation position of the vehicle axle is effected here by means of the easily executed adaptation of the spring caliper which is easy to fabricate, and of the counterplate which is also easy to fabricate. Changes to the angular parts, to the vehicle axle or to the vehicle axle during the mounting of the angular parts are not necessary to achieve this.

According to one particularly advantageous embodiment the attachment means according to the invention, each vertical section of the angular parts may be formed from a base which is arranged on the associated horizontal section, and from two limbs which start from this base and extend bearing essentially vertically and laterally against the vehicle axle. This measure results, in particular, in an additional saving in material.

In order to adapt the vertical sections to different loading situations, which may result, for example, from the installation position of the vehicle axle, from the type of the vehicle and from the spring track, the distance between the limbs may either be constant along their vertical extent, or decrease up to the centre of the limb and then increase again or increase up to the centre of the limb and then decrease again.

Furthermore, there may be provision for each vertical section to have an inner side which faces the vehicle axle and whose contour is formed so as to be essentially complementary to the external contour of the associated region of the vehicle axle. This measure makes it possible to adapt the attachment means according to the invention to different axle body shapes and to form a positive lock between the vehicle axle and the angular parts welded to one another, in order to transmit tilting moments.

Further important features and advantages of the attachment means according to the invention emerge from the sub-claims, from the drawings and from the associated description of the figures.

The aforementioned features and the features yet to be mentioned below, can, of course, be used not only in the respectively specified combination but also in other combinations or in isolation, without departing from the framework of the present invention.

BRIEF DESCRIPTION OF THE DRAWINGS

Preferred exemplary embodiments of the invention are illustrated in the drawings and will be explained in more detail in the following description. The figures show schematic views as follows:

FIG. 1 shows a cross section through an attachment means according to the invention, translated with respect to the longitudinal direction of a vehicle axle, angular parts which comprise the vehicle axle being illustrated in non-sectional form, FIG. 2 shows a side view of the attachment means according to the invention corresponding to the arrow II in FIG. 1, a spring caliper being illustrated in the right-hand half of FIG. 2 (FIG. 2A), and a counterplate being illustrated in section along the sectional line IIA in FIG. 1, FIG. 3 shows a cross section like that in FIG. 1, but with different cross sections of the vehicle axle (FIG. 3A to FIG. 3B), and FIG. 4 shows a side view like that in FIG. 2, but with different embodiments of sections (FIGS. 4A to 4D) of angular parts which extend vertically.

DETAILED DESCRIPTION OF THE PREFERRED EMBODIMENT

According to FIG. 1, an attachment means 1 according to the invention for attaching a tubular vertical axle 2 to an axle suspension (not illustrated) is formed with a first, upper angular part 3 and with a second, lower angular part 4. The upper angular part 3 has a horizontal section 5 which rests on the top of an upper side 9 of the vehicle axle 2, and a vertical section 6 which bears against a left-hand outer side 11 of the vehicle axle 2. In a corresponding way, the lower angular part 4 has a horizontal section 7 which bears against an underside 10 of the vehicle axle 2, and a vertical section 8 which bears against a right-hand outer side 12 of the vehicle axle 2.

The angular parts 3 and 4 are welded with their vertical sections 6 and 8 to the vehicle axle 2 in the vicinity of a neutral fibre 13. The corresponding welds are marked by 14 and 15. The angular parts 3 and 4 are connected to one another by means of welds 16 and 17, in particular in order to transmit compressive forces and tensile forces. The welds 16 and 17 are formed here on the free ends, which adjoin one another alternately, of the horizontal sections 5 and 7 and of the vertical sections 6 and 8.

A spring caliper 19 is fitted onto an upper side 18 of the horizontal section 5 of the upper angular part 3. In order to compensate an inclination of the upper side 18 of the horizontal section 5 with respect to an upper side 20 of the spring caliper 19 which comes about owing to the angular position of the vehicle axle 2, an axle spring (not illustrated) being supported on said upper side 20, an underside 21 of the spring caliper 19, with which the spring caliper 19 rests on the upper side 18 of the horizontal section 5, is correspondingly inclined. Furthermore, a stop 22, which is assigned to a corner region 23 of the upper angular part 3 and in which the horizontal section 5 and the vertical section 6 of this angular part 3 are connected to one another is formed on the spring caliper 19. This measure results in a positive lock between the spring caliper 19 and the upper angular part 3. Because the axle spring is supported on the upper side 20 of the spring caliper 19, the spring caliper 19 is loaded with a downwardly directed spring force 24. Owing to the inclination which prevails between the spring caliper 19 and the upper angular part 3, the spring caliper 19 is secured by the stop 22 on the upper angular part 3. Furthermore, the spring caliper 19 can be attached to the upper angular part 3 with a positioning bolt or by means of tacking. "Tacking" is understood here to be a relatively weak, in particular spot-welded connection.

In a corresponding way, a counterplate 26 is fitted on an underside 25 of the horizontal section 7 of the lower angular part 4, an upper side 27, resting on the underside 25 of the lower angular part 4, of the counterplate 26 being also matched to the relative angular position of the vehicle axle 2, and thus of the angular parts 3 and 4, in which case the upper side 27 of the counterplate 26 then extends with an inclination corresponding to an underside 28 of the counterplate 26. In addition, a shoulder 29, which forms a stop for a corner region 30 of the lower angular part 4, is also formed on the counterplate 26.

Spring clips 31, which are also referred to as "spring clamps" and are illustrated in each case only symbolically and incompletely in FIGS. 1 and 2 are attached to the counterplate 26. These spring clips 31 are used to apply a counter force 32 to the counterplate 26, which force acts counter to the spring force 24. The spring clips 31 form here a spring clip pre-stress between the spring caliper 19 and the counterplate 26, which is generally greater than the forces which are to be expected and to be borne by the axle spring (not illustrated). In the attachment means which is embodied according to the invention, this spring clip pre-stress is supported by the angular parts 3 and 4 without excessively large forces engaging on the vehicle axle 2 in the process. The pre-stressing forces are therefore, as it were, conducted around the vehicle axle 2.

The vertical sections 6 and 8, bearing against the outer sides 11 and 12, of the angular parts 3 and 4 have inner sides 33 and 34 which have an inner contour which is complementary to the outer contour of the respective outer side 11 or 12, so that the vertical sections 6 and 8 come to bear over a large surface on the vehicle axle 2. These measures enable tilting moments which are induced in the vehicle axle 2 to be transported particularly well to the axle suspension.

A significant advantage of the attachment means according to the invention is to be seen in the fact that at least in the cases in which the upper side 20 of the spring caliper 19 runs parallel to the underside 21 of the spring caliper 19, this spring caliper 19 can also be dispensed with, or is formed by the horizontal section 5 of the upper angular part 3 itself. In a corresponding way, embodiments are also possible in which the counterplate 26 can be dispensed with or is formed by the horizontal section 7 of the lower angular part 4.

According to FIG. 2, the vertical section 6 is formed by two limbs 35 and 36 which are connected to one another and to the horizontal section 5 by means of a base 37. Preferably, the vertical section 8 (not visible in FIG. 2) is also embodied in a corresponding way. Limbs 35 and 36 thus extend from the base 37, i.e. from the horizontal section 5, as far as the horizontal section 7 of the other angular part 4. The limbs 35 and 36 are attached to this horizontal section 7 by means of the welded connections 16.

As is clear from FIG. 2, the limbs 35 and 36 are spaced apart from one another, this spacing firstly decreasing starting from the base 37 in the direction of the extent of the limbs 35 and 36, being at a minimum in the vicinity of the neutral fibre 13 and increasing again up to the free ends of the limbs 35 and 36. This shaping enables the vertical sections 6 and 8 to be matched to the specific installation situation and the prevailing specific load situations of this embodiment.

According to FIGS. 3A, 3B and 3C, the angular parts 3 and 4 have complementary internal contours which are respectively matched to the external contour of the vehicle axle 2. In FIG. 3C, the horizontal section 5 of the upper angular part 3 has a wedge-shaped extension 38 in the vicinity of its welded connection 17 to the vertical section 8 of the lower angular part 4, as a result of which the internal contour of the upper angular part 3 extends around approximately 170° of the circular cross section of the vehicle axle 2.

FIGS. 4A, 4B, 4C and 4D show different variants of the shaping of the limbs 35 and 36 of the vertical section 6 of the upper angular part 3. The shaping of the limbs 35 and 36 depends here on the typical load situations which the vehicle axle 2 experiences in the vicinity of its suspension. These load situations depend, for example, on the spring track, on the wheel base of the vehicle axle 2 and on the wheel track on the vehicle axle 2.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A suspension member adapted for attaching a vehicle axle including a spring clip, said suspension member comprising:
   a pair of angular-members, each of the pair of angular members having a vertical section and a horizontal section, the vertical section having a free end, the horizontal section having a free end, the free end of the vertical section of a first one of the pair of angular members being connected to the free end of the horizontal section of a second one of the pair of angular members, the horizontal section of the first one of the pair of angular members adjacent to the top of the vehicle axis, the horizontal section of the second one of the pair of angular members adjacent to the bottom of the vehicle axis.

2. A suspension member as claimed in claim 1 wherein the horizontal section of one of the pair of angular members forms a spring caliper member.

3. A suspension member as claimed in claim 1 wherein the free end of the vertical section of the first one of the pair of angular members is welded to the free end of the horizontal section of the second one of the pair of angular members.

4. A suspension member as claimed in claim 2 wherein the horizontal section of one of the pair of angular members forms a counterplate member.

5. A suspension member as claimed in claim 4 wherein the spring caliper member includes a shoulder.

6. A suspension member as claimed in claim 4 wherein the counterplate member includes a shoulder.

7. A suspension member as claimed in claim 1 wherein the vertical section of each of the pair of angular members includes a portion forming at least a neutral fiber.

8. A suspension member as claimed in claim 1 wherein each of the pair of angular members includes a vertical section including two limbs, the two limbs are connected to one another and to the horizontal section.

9. An apparatus for attaching a vehicle axle to an axle suspension member, said apparatus comprising:
   a spring caliper member adjacent the upper side of the vehicle axle;
   a counterplate member adjacent the underside of the vehicle axle;
   a pair of spring clip members adjacent to the vehicle axle and connected to the counterplate member; and a pair angular members, each of said pair angular members having a vertical section and a horizontal section, the vertical section having a free end, the horizontal section having a free end, the free end of the vertical section connected to the free end of the horizontal section.

10. An apparatus as claimed in claim 9 wherein the horizontal section of a first one of the pair of angular members is adjacent to the top of the axle and the horizontal section of a second one of the pair of angular members is adjacent to the bottom of the axle.

11. An apparatus as claimed in claim 9 wherein the spring caliper member is formed of the horizontal section of one of the pair of angular members.

12. An apparatus as claimed in claim 9 wherein the counterplate member is formed of the horizontal section of one of the pair of angular members.

13. An apparatus as claimed in claim 9 wherein the vertical section is connected to the vehicle axle.

14. An apparatus as claimed in claim 9 wherein the vehicle axle includes a portion forming a neutral fiber.

15. An apparatus as claimed in claim 9 wherein the free end of the vertical section is joined to the free end of the horizontal section.

16. An apparatus as claimed in claim 9 wherein the free end of the vertical section is welded to the free end of the horizontal section.

17. An apparatus as claimed in claim 9 wherein the vertical section is formed of two limbs, the two limbs are connected to one another and to the horizontal section.

18. An apparatus as claimed in claim 1 wherein the free end of the vertical section is welded to the free end of the horizontal section.

19. An apparatus as claimed in claim 8 wherein the two limbs are spaced apart from each other.

20. A suspension member as claimed in 19 claim wherein the spacing between the two limbs varies longitudinally.

* * * * *

UNITED STATES PATENT AND TRADEMARK OFFICE
CERTIFICATE OF CORRECTION

PATENT NO.   : 6,406,044 B1
DATED         : June 18, 2002
INVENTOR(S)  : Axel Wisotzky It is certified that error appears in the above-identified patent and that said Letters Patent is hereby corrected as shown below:

<u>Column 5,</u>
Line 8, change "comer" to -- corner --.

Signed and Sealed this

Thirtieth Day of March, 2004

JON W. DUDAS
*Acting Director of the United States Patent and Trademark Office*